Patented Jan. 25, 1949

2,460,077

UNITED STATES PATENT OFFICE 2,460,077

METHOD OF PROCESSING CASINGS

Thomas R. Ernest, Chicago, Ill., assignor to Thompson Manufacturing Co., Chicago, Ill., a corporation of Delaware No Drawing. Application May 21, 1945, Serial No. 595,055

11 Claims. (Cl. 99—175)

This invention relates in general to a new and improved method for processing casings and is more particularly described as a method for processing gut casings for food products, musical strings and medical sutures.

An important object of the invention is to reduce the time and labor taken in processing casings of this kind by reducing the number of strippings necessary in processing them.

A further object of the invention is to soften and more easily eliminate the mucosa linings and other impurities and to preserve the sub-mucosa or the collagen fibers which contribute to the strength of the casings.

A further object of the invention is to eliminate bad odors during the processing, to prevent the growth of anaerobic bacteria and to promote the growth of aerobic bacteria.

A further object of the invention is to prevent the formation of putrefactive enzymes by the anaerobic bacteria and thus preserve the strength of the casings.

A further object of the invention is to prevent the formation of such substances as sulfides, free sulfur, etc. from sulphates by the reduction of the latter and thus prevent the formation of black substance such as iron sulfide or other black sulfides which darken the finished product.

In the method of processing casings heretofore employed they were put into water and left until soft and then were stripped by pulling them through the hands and squeezing out loosened mucosa and other undesirable materials. This operation is repeated a number of times until the casings are ready for splitting or for further processing, such as cleaning, spinning, etc. By this method of continued stripping and cleaning, anaerobic bacteria multiply and produce putrefactive products which have a very disagreeable odor, holes and rips are produced which detract from the value of the casings. The enzymes produced by these bacteria also act upon the sub-mucosa or collagen layer producing weak places in the casings which weakens the finished product. The growth of anaerobes also results in the reduction of certain substances such as sulfates to sulfides, thereby causing a darkening of the product and producing dark streaks in finished sutures.

In the present new and improved process, the casings are put into proper containers and kept in contact with water that is saturated with air or oxygen. This may be accomplished by bubbling air through the water in which the casings are immersed, or in any other suitable manner of keeping the water saturated with air or oxygen.

The water is preferably heated and maintained at a heat of approximately 100° F., or at any proper temperature to bring about the desired result in the time available for the operation, it being understood that by lowering the temperature, the operation can be spread over a longer time. At 100° F. the casings are at about the normal body heat of the living animals from which they are taken, and thus the casings are most nearly in the normal condition in which they are found in the animal.

One way of carrying out this invention is to place a number of the casings to be treated in open baskets or containers of wire or metal of a size to hold 100 or more casings. These baskets or containers are immersed in water, in barrels, or casks so that the casings are completely covered with water, and air or oxygen is blown into the water in any suitable manner preferably by having a multi-opening discharge head at the bottom of the barrel or cask connected to an air or oxygen supply pipe, so that the air or oxygen would be broken up into a multitude of small bubbles or streams which pass upwardly in the water around and through the containers and the casings therein, agitating the water and saturating it with air or oxygen which also comes in contact with the casings themselves as it passes upwardly through the water and through the baskets containing the casings.

Under these conditions, aerobic bacteria develop and bring about changes inside and outside of the casing that result in the softening of the casings and the liquefaction of the intestinal lining without the production of the disagreeable odors that result from the old method.

This aeration or oxygen treatment is continued until the casings are soft and the mucosa linings is liquefied or separated from the sub-mucosa or collagen layer which is to be retained. The casings are then stripped by machines or by pulling them through the hands and squeezing out the loosened mucosa, and whereas this process was previously repeated a number of times, it is found by this aeration or oxygen treatment that one stripping now takes the place of numerous strippings which were previously required for cleaning the casings.

Thus the time and labor required by this process to get casings ready for splitting or cleaning is much less, and the casings are not weakened by continued pulling or by the development of detrimental bacteria and enzymes as in the old process. The prevention of anaerobic bacteria by the continued supply of air or oxygen also prevents the reduction of substances such as sulfates to sulfides or to free sulfur, and this results in an improved product.

After the casings are thus treated and stripped, they are ready for splitting or further processing if the entire casings are to be used.

While the preferred process for processing gut casings is thus described, it will be apparent that various other modifications may be made without departing from the spirit and scope of the invention.

I claim:

1. A new and improved method of processing gut casings which comprises immersing the casings and keeping them in contact with water and agitating the casings and the water with oxygen bubbled therethrough.

2. The method of processing gut casings which comprises immersing the casings in water and bubbling air through the water in which the casings are immersed.

3. The method of processing gut casings free from anaerobic bacteria which comprises depositing the casings in water until they are soft and in bubbling air through the water in which the casings are immersed and in stripping loosened mucosa by hand from the casings.

4. A new and improved method of processing gut casings free from putrefactive products which have a disagreeable odor which comprises immersing the casings in water, in heating the water substantially to approximately 100° F. the body heat of the animals from which the casings are derived, and in bubbling oxygen through the water in which the casings are immersed.

5. The method of processing gut casings comprising immersing the casings in permeable condition in water at about 100° F. and agitating the casings and the water with air bubbled therethrough until the casings are soft, loosening the inner intestinal lining.

6. A new and improved method of processing gut casings comprising immersing the casings in permeable condition in water heated approximately to 100° F., in continuously aerating the water and casings and agitating them by bubbling air through the casings until they are soft and the intestinal lining is loosened, and in squeezing out the intestinal lining and mucosa loosened therewith by stripping the casings.

7. The method of processing gut casings to remove the objectionable mucosa linings without weakening the sub-mucosa or collagen layer which comprises immersing the casings in water until they are soft, in bubbling oxygen through the water and through the casings immersed therein to continuously agitate the casings, and in stripping the casings squeezing out the loosened mucosa layer without weakening the sub-mucosa layer.

8. The new and improved method of processing gut casings to liquify the intestinal mucosa lining without the production of disagreeable odors which comprises depositing the casings in water and agitating the casings and the water with air bubbled therethrough until the intestinal lining is thoroughly softened and aerated, and in stripping the lining by pulling the casings through the hands.

9. A new and improved method for processing gut casings which comprises immersing a plurality of casings in water in a loose condition and in continuously aerating and agitating the water and the casings with air until the casings are soft and the objectionable intestinal lining is loosened, and in removing the loosened lining by a single stripping.

10. The new and improved method of processing gut casings by producing aerobic bacteria and preventing the reduction of sulfates within the casings to sulfides, which comprises aerating and agitating the casings continuously while immersing them in water until they are soft and loosening the inner mucosa lining which is then squeezed out by stripping.

11. A new and improved method of processing gut casings by reducing anaerobic bacteria and in promoting aerobic bacteria, which comprises immersing a plurality of casings in water in a loose and permeable condition, in continuously bubbling through and agitating the water and casings with air until the casings are soft, loosening the inner mucosa lining of the casing and freeing the sub-mucosa linings from objectionable bacteria by the continued presence of air, and squeezing out the loosened mucosa intestinal lining by stripping the casings.

THOMAS R. ERNEST.

REFERENCES CITED

The following references are of record in the file of this patent:

UNITED STATES PATENTS

| Number | Name | Date |
| --- | --- | --- |
| 1,855,925 | Pulley et al. | Apr. 26, 1932 |
| 1,988,747 | Oppenheimer | Jan. 22, 1935 |
| 2,381,813 | Epst | Aug. 7, 1945 |

OTHER REFERENCES

Moulton: Casings, Meat Magazine (1936).

Buchanan: Bacteriology, 4th edition, Macmillan Co., page 363.